US012579091B2

(12) United States Patent
Brew et al.

(10) Patent No.: US 12,579,091 B2
(45) Date of Patent: Mar. 17, 2026

(54) SECURE DUAL FUNCTION USB CONNECTOR

(71) Applicant: International Business Machines Corporation, Armonk, NY (US)

(72) Inventors: Kevin Wayne Brew, Niskayuna, NY (US); Clint Jason Oteri, East Greenbush, NY (US); Joseph James Jimenez, Albany, NY (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 18/626,364

(22) Filed: Apr. 4, 2024

(65) Prior Publication Data

US 2025/0315395 A1 Oct. 9, 2025

(51) Int. Cl.
G06F 13/38 (2006.01)
G06F 12/0802 (2016.01)
G06F 13/42 (2006.01)

(52) U.S. Cl.
CPC ........ G06F 13/382 (2013.01); G06F 12/0802 (2013.01); G06F 13/4282 (2013.01); G06F 2213/0042 (2013.01)

(58) Field of Classification Search
CPC .................................................. G06F 18/2178
See application file for complete search history.

(56) References Cited

U.S. PATENT DOCUMENTS

| | | | | |
|---|---|---|---|---|
| 6,608,264 | B1 * | 8/2003 | Fouladpour | ............ H01R 29/00 |
| | | | | 307/64 |
| 6,925,554 | B1 | 8/2005 | Wright | |
| 9,015,360 | B2 | 4/2015 | Schuh | |
| 9,665,713 | B2 * | 5/2017 | Avasarala | ............ G06F 21/566 |
| 10,176,134 | B2 | 1/2019 | Liu | |
| 10,579,569 | B2 | 3/2020 | Hsu | |
| 11,003,617 | B2 | 5/2021 | Chen | |

(Continued)

FOREIGN PATENT DOCUMENTS

EP            0206897 A3     12/1986

OTHER PUBLICATIONS

"USB Extension Cable with Data/Charge Sync Switch", Product ID: 3438, 5 pages, downloaded from the Internet Jan. 9, 2024.

(Continued)

*Primary Examiner* — Henry Tsai
*Assistant Examiner* — Juanito C Borromeo
(74) *Attorney, Agent, or Firm* — Monchai Chuaychoo

(57) ABSTRACT

An approach for managing digital communication between a primary device and a secondary device is disclosed. The approach can include one or more cables comprising a wire and a connection end with one or more pins and circuitry disposed on the primary and secondary device, wherein the circuitry manages power and data communication of the one or more cables. The approach contains a microcontroller disposed between the wire and the connection end of the one or more cables. The microcontroller further comprises a cache NVM (non-volatile memory), wherein the cache NVM cache is encoded with an algorithm, wherein the algorithm is configured to cause the microcontroller to instruct a switching circuit to activate and deactivate the one or more pins in the connection end based on analyzing data transmitted.

19 Claims, 7 Drawing Sheets

(56) References Cited

U.S. PATENT DOCUMENTS

| | | | |
|---|---|---|---|
| 11,640,192 B2 | 5/2023 | Polasa | |
| 2006/0236141 A1* | 10/2006 | Chang | G06F 1/26 |
| | | | 713/300 |
| 2014/0239886 A1 | 8/2014 | Lalitnuntikul | |
| 2018/0239718 A1 | 8/2018 | Jabori | |
| 2021/0019274 A1 | 1/2021 | Yu | |
| 2021/0218254 A1* | 7/2021 | Adams | H02J 7/00306 |
| 2023/0185752 A1 | 6/2023 | Gagne-Keats | |
| 2023/0222084 A1 | 7/2023 | Kang | |
| 2023/0361592 A1 | 11/2023 | Li | |

OTHER PUBLICATIONS

"What is 'Juice Jacking' and Tips to Avoid It", Federal Communications Commission, Updated Thursday, Apr. 27, 2023, 2 pages, <https://www.fcc.gov/juice-jacking-tips-to-avoid-it>.

Amazon—ANDTOBO USB Switch Extension Cable, Upgraded USB Extension Cord with On/Off Power Switch Cable for LED Strips, iOS System, etc, 8 pages, downloaded from the Internet Aug. 14, 2023.

Amazon—StarTech.com 3ft (1m) Secure Charging Cable USB-A to USB-C Data Blocker Charge-Only Cable No-Data Power-Only Charger Cable for Phone/Tablet Data Blocking USB Protector Adapter Cable (USBSCHAC1M), 8 pages, downloaded from the Internet Aug. 14, 2023.

Carminati et al., "Micro-USB Connector Pins As Low-Cost, Robust Electrodes for Microscale Water Conductivity Sensing in Oceanographic Research", ScienceDirect, Elsevier, Procedia Engineering 168 ( 2016 ) pp. 407-410, 30th Eurosensors Conference, EUROSENSORS 2016.

Faife, Corin, "The new USB Rubber Ducky is more dangerous than ever", The Verge, Aug. 16, 2022, 9 pages.

Islam et al., "Study and Development of PIC Microcontroller-to-PC Communication via USB", Published in International Journal of Trend in Scientific Research and Development (IJTSRD), ISSN: 2456-6470, vol. 4 Issue 5, Aug. 2020, 4 pages, URL:www.ijtsrd.com/papers/ijtsrd29309.pdf.

Jagun et al., "Design and Development of a Computer Controlled Switching System via Universal Serial Bus Port", FUTOJNLS 2020 vol. 6, Issue-2, pp. 126-141, Research Paper, Dec. 2020.

Kim et al., "Fuzzy the Power: Dual-Role State Guided Black-Box Fuzzing for USB Power Delivery", usenix, This paper is included in the Proceedings of the 32nd USENIX Security Symposium, Aug. 9-11, 2023 • Anaheim, CA, USA, 18 pages.

Sadat et al., "Alternate Mode for USB Type-CTM : Going Beyond USB", Texas Instruments, Oct. 2016, 9 pages.

Anderson Tom. "Tom's Circuits—PC Board Layout for USB-C Connectors", DFM for High-Speed Digital PCBs, Mar. 27, 2023, 18 Pages.

No Author "Turn off power to Thunderbolt device while leaving data connection", Askdifferent, Jun. 17, 2020, 1 Page.

* cited by examiner

100A

Cable
Bundle

Individual
wires

Circuit Board

101

USB port

*(Angled Exploded
View)*

USB port opening

110

101

Circuit Board

USB port

*(Top Exploded
View)*

Cable
bundle

100B

150

Secondary Device

Connection between primary
and secondary devices

110

101

USB port

Circuit Board

Cable
bundle

Primary Device

130

110

*110 is optional in this embodiment*

Circuit Board

210

220

Cable
bundle

101

USB port

222

Memory

223

221

CPU

Input and
Output

220

*110 is optional in this embodiment*

110

Circuit Board

210

220

Cable Bundle

101

USB port

220

222

224

Memory

CPU

221

Input and Output

223

220

SECURE DUAL FUNCTION USB CONNECTOR

BACKGROUND

The present invention relates generally to USB (universal serial bus) technology and more particularly to smart connectivity to other devices.

Portable electronic devices rely on USB ports and cables to charge and/or communicate to other devices. The ability to simultaneously charge and communicate of the USB cable is dependent on which data pins are connected or disconnected. Conversely, having the data pins connected can allow malware intrusion into the portable electronic device when unsuspected users are connecting data cables in unsecure public environments.

SUMMARY

Aspects of the present invention disclose a method, a system and computer program product for managing digital communication between a primary device and a secondary device is disclosed. The system can include one or more cables comprising a wire and a connection end with one or more pins and circuitry disposed on the primary and secondary device, wherein the circuitry manages power and data communication of the one or more cables. The approach contains a microcontroller disposed between the wire and the connection end of the one or more cables. The microcontroller further comprises a cache NVM (non-volatile memory), wherein the cache NVM cache is encoded with an algorithm, wherein the algorithm is configured to cause the microcontroller to instruct a switching circuit to activate and deactivate the one or more pins in the connection end based on analyzing data transmitted.

According to another embodiment of the present invention, there is provided a method. The system comprises a processing unit; and a memory coupled to the processing unit and storing instructions thereon. The instructions, when executed by the processing unit, perform acts of the method according to the embodiment of the present invention. The instructions can include the steps of, determining an initial device mode; selecting a subsequent mode for the device; if the subsequent mode is open then activating all power pins and data pins of the one or more pins; if the subsequent mode is closed then deactivating all power pins and data pins of the one or more pins; if the subsequent mode is power-only then activating all the power pins of the one or more pins; if the subsequent mode is secure then checking on-board memory associated with the microcontroller and initiating handshake; in response to a failure with checking on-board memory then selecting power-only mode for the device; in response to a failure with handshaking then selecting power-only mode for the device; in response to a success with checking on-board memory and handshake then initializing sniffer and on-chip analysis module, wherein the sniffer and on-chip analysis is checking for directional communication; determining that the directional communication is not correct or there are malicious data then selecting power-only mode for the device; and continuously analyzing the data from the cable while connected.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1A:
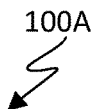
FIG. 1A is a diagram illustrating USB port with a switch, designated as 100A, in accordance with an embodiment of the present invention.

In the current state of the art as it pertains to preventing malware intrusion via USB (universal serial bus) port (e.g., USB-A, USB-C, etc.) can present some challenges. For example, users at airports or other public environments, where the facility provides free charging of portable devices via USB stations, may unknowingly connect to USB ports that have been hijacked with possible malware intrusion and/or cyber-theft software. Bad actors can load malware onto public USB charging stations to obtain access to mobile and/or portable electronic devices from the owners of those devices.

Embodiments of the present invention disclose structures and methods to automatically and manually detect data transfer and actuate protocols to prevent any malicious data transfer to a plugged-in device via USB port.

In some embodiments, a manual switch (operated by the user) is provided that slides out the data pins for full functionality. If the switch is disengaged, only power delivery (PD) pins are accessible.

In some embodiments, an on-board SoC (system on chip) is provided. The SoC functions on the high voltage line of cable and can detect pushed data to a plugged-in device and disconnects data transfer capabilities until the user enables them.

In some embodiments, another on-board SoC is provided and can filter any signals not necessary for PD (fast charging). For example, PD requires communication over the C-C pins on a USB-C cable.

Definitions

Typically, the term "primary device" is used to denote a computerized device (with USB connection/ports) that the user is protecting (i.e., secured) from malicious intrusion. For example, a laptop belonging to a user may be considered a "primary device".

The term "secondary device" is used to denote an "unknown" device that is connected to the primary device. Using a previous example, a USB charging station at an airport can be considered a secondary device since it is connected to the user's laptop (i.e., primary device). In other examples, a secondary device can be (depending on the situation), an unknown mobile phone, unknown laptop or unknown tablet.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematics and are not drawn to scale. It should also be understood that the same reference numerals are used throughout the Figures to indicate the same or similar parts.

FIG. 1A is a diagram (with two views) illustrating USB port with a switch, designated as 100A, in accordance with an embodiment of the present invention. 100A includes USB port 101 and pin switch 110. USB port 101 can denote different physical embodiments of USB ports, such as USB-A, USB-C and USB mini, etc. USB switch 110 represents a manually operated switch that physically disconnect data pins. For example, if the switch is disengaged, only charging pins (i.e. 5 Volt) are available.

Figure 1B:
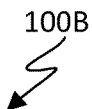
FIG. 1B is a diagram illustrating connection between a primary device and a secondary device, designated as 100B, in accordance with an embodiment of the present invention.
Figure 1B:
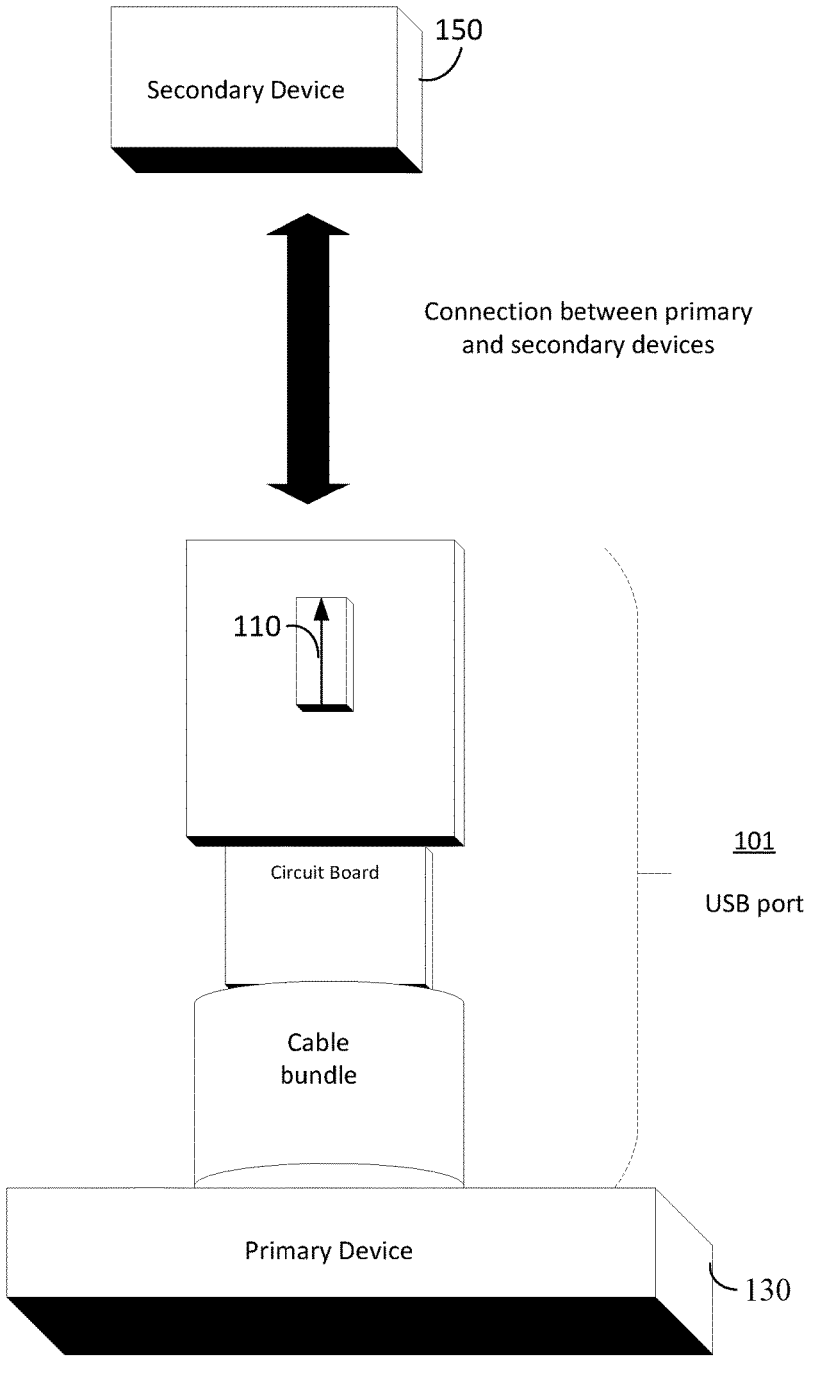

FIG. 1B is a diagram illustrating connection between a primary device (i.e., 130) using USB port 101 to a secondary device (i.e., 150), designated as 100B, in accordance with an embodiment of the present invention.

Figure 2A:
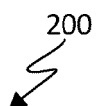
FIG. 2A is a diagram illustrating a "chiplet" (residing on the USB cable) that can control data flow between a USB port (of primary device) via USB cable to a secondary device, designated as 200, in accordance with an embodiment of the present invention.

FIG. 2A is a diagram illustrating a "chiplet" (residing on the USB cable) that can control data flow between a USB port (of a primary device, which can be a mobile device of a user) via USB cable, designated as 200, in accordance with an embodiment of the present invention. FIG. 2A includes chiplet 220 and switching circuit 210. It is noted that 110 is optional since 210 can be used to electronically switch the wiring inside the USB circuit board.

In an embodiment, switching circuit 210 (similar functionality to USB switch 110) can activate/deactivate (i.e., disconnect/connect) various pins of the cabling (e.g., USB, SATA, etc.) between the primary and secondary devices by an electro-mechanical coupling.

In one embodiment, chiplet 220 is a microcontroller that includes at least, CPU 221, memory 222 and I/O (input/output) 223. Chiplet 220 can provide the following functionalities, but is not limited to, i) analysis of data in real-time to assess any possible threats and ii) controls an electro-mechanical switch (i.e., switching circuit 210). It is noted that this block diagram is not drawn to scale and/or displays any detailed interconnecting lines between the module and objects within 220.

In an embodiment, chiplet 220 and/or switching circuit 210 resides on the USB cable itself. It is noted that once the USB cable is unplugged from either the primary and/or secondary devices, there is no power to chiplet 220 and/or to switching circuit 210. Thus, chiplet 220 and switching circuit 210 can only function (with electrical power) when it the cable is plugged to either USB port of the primary and/or secondary device.

In another embodiment, chiplet 220 is a SoC (system on chip) that may have other circuitry built into control switch circuit 210.

In some embodiments, chiplet 220 and switch control circuit 210 may reside and be used in any hard drives (e.g., SSD, platter hard drive, etc.) that utilizes USB ports.

In some embodiments, chiplet 220 and switch control circuit 210 may reside and be used in any hard drive that utilizes SATA (serial advancement technology attachment) connection.

Figure 2B:
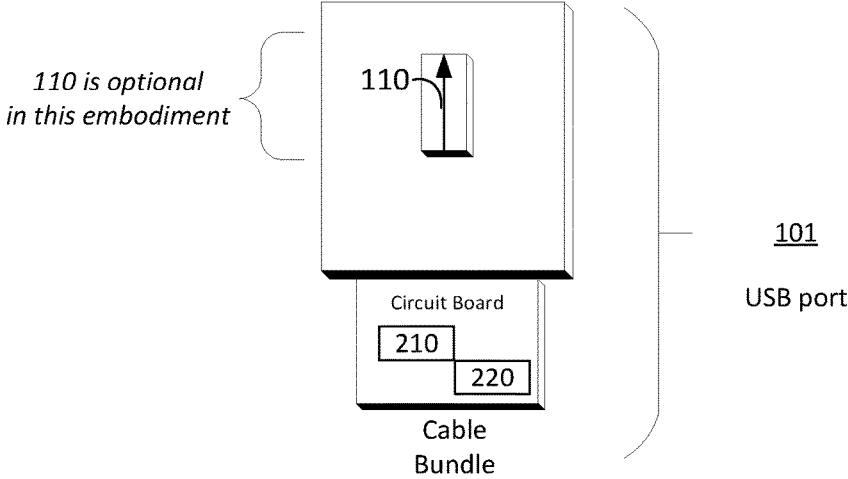
FIG. 2B is a diagram illustrating a "chiplet" (residing on the USB port) that can control data flow between a USB port (of primary device) via USB cable to a secondary device in accordance with an embodiment of the present invention.

FIG. 2B is a diagram illustrating a "chiplet" (residing on the USB port) that can control data flow between a USB port (of a primary device, which can be a mobile device of a user) via USB cable, designated as 210, in accordance with an embodiment of the present invention. FIG. 2A includes chiplet 220 and switching circuit 210. Instead of residing on the USB cable itself, chiplet 220 and/or switching circuit 210 may reside on the USB port of the primary device (i.e., mobile device of a user).

Alternative Embodiments of FIGS. 2A and 2B

In some embodiments, chiplet 220 and switch control circuit 210 may reside and be used in any hard drives (e.g., SSD, platter hard drive, etc.) that utilizes USB ports. It is noted that SSD (solid state drives) could include USB memory sticks.

In some embodiments, chiplet 220 and switch control circuit 210 may reside and be used in any hard drive that utilizes SATA (serial advancement technology attachment) connection. Thus, a secondary device can be one or more portable hard drives (even USB memory stick) connected to a primary device such as, but not limited to, PC desktops and laptops.

Figure 2C:
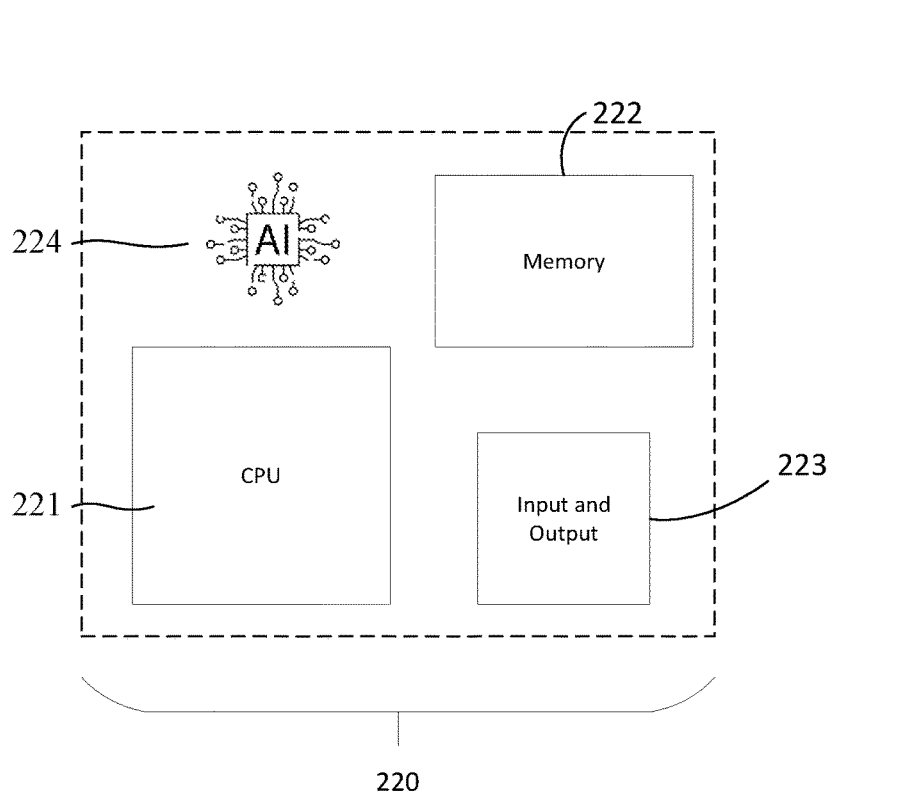
FIG. 2C is a diagram, (exploded view) of the "chiplet" with an addition of an AI (artificial intelligence) module, designated as 220, in accordance with an embodiment of the present invention.

FIG. 2C is a diagram, (exploded view) of the "chiplet" with an addition of an AI (artificial intelligence) module, designated as 220, in accordance with an embodiment of the present invention. It is noted that this block diagram is not drawn to scale and/or displays any detailed interconnecting lines between the module and objects within 220.

In 220, there is an additional module of 224, AI, which serves as an artificial intelligence function that allows real time threat assessment and continuously learning of current and possibly future threats. It is noted that AI module 224 is not an actual self-contained hardware but a mere representation of an additional capability of 220 that is not present in FIG. 2A.

Figure 3:
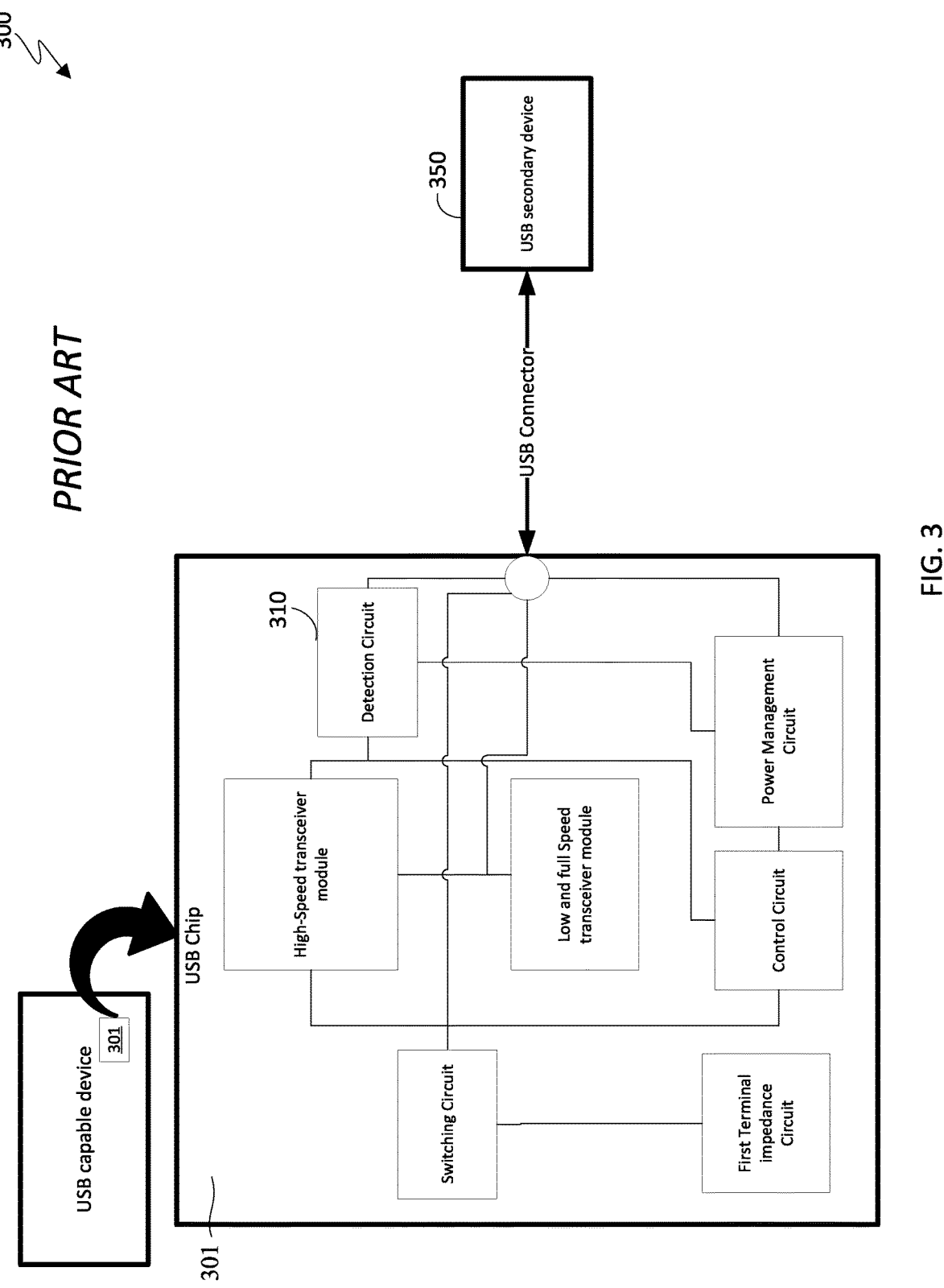
FIG. 3 is a simplistic circuit diagram showing internals of a typical USB chip that is well known in the art (i.e., prior art), designated as 300, in accordance with an embodiment of the present invention.

FIG. 3 is a simplistic circuit diagram showing internals of a typical USB chip that is well known in the art (i.e., prior art), designated as 300, in accordance with an embodiment of the present invention. It is noted that this block diagram is not drawn to scale and/or displays any detailed interconnecting lines between the module and objects within USB chip 301.

This diagram of 301 illustrates various typical components that supports USB communication (i.e., prior art). However, there are a few internal objects within 301 that are noteworthy, such as detection circuit 310 and connector junction 330. Detection circuit 310 is a circuit that is generally a circuit used to "sense" current/voltage on the wires from the USB cable. Connector junction 330 is connection point where wires from the USB cable bundle terminates onto the USB chip. It is noted that USB chip 301 in this figure is used by a primary device (i.e., mobile phone a user). However, secondary device 350 may have the same setup (i.e., USB chip 301) as well in order to communicate/charge with the primary device. It is noted that this diagram illustrates a safeguard against possible bad actors from injecting a secondary device into the primary device, such as at a charging station at an airport.

In this diagram, a primary device is connected to a secondary device 350 via USB connector. It is noted that the wiring connection are not drawn to scale and/or contain all the necessary wiring since someone skilled in the art would be able to understand the block connection.

Figure 4:
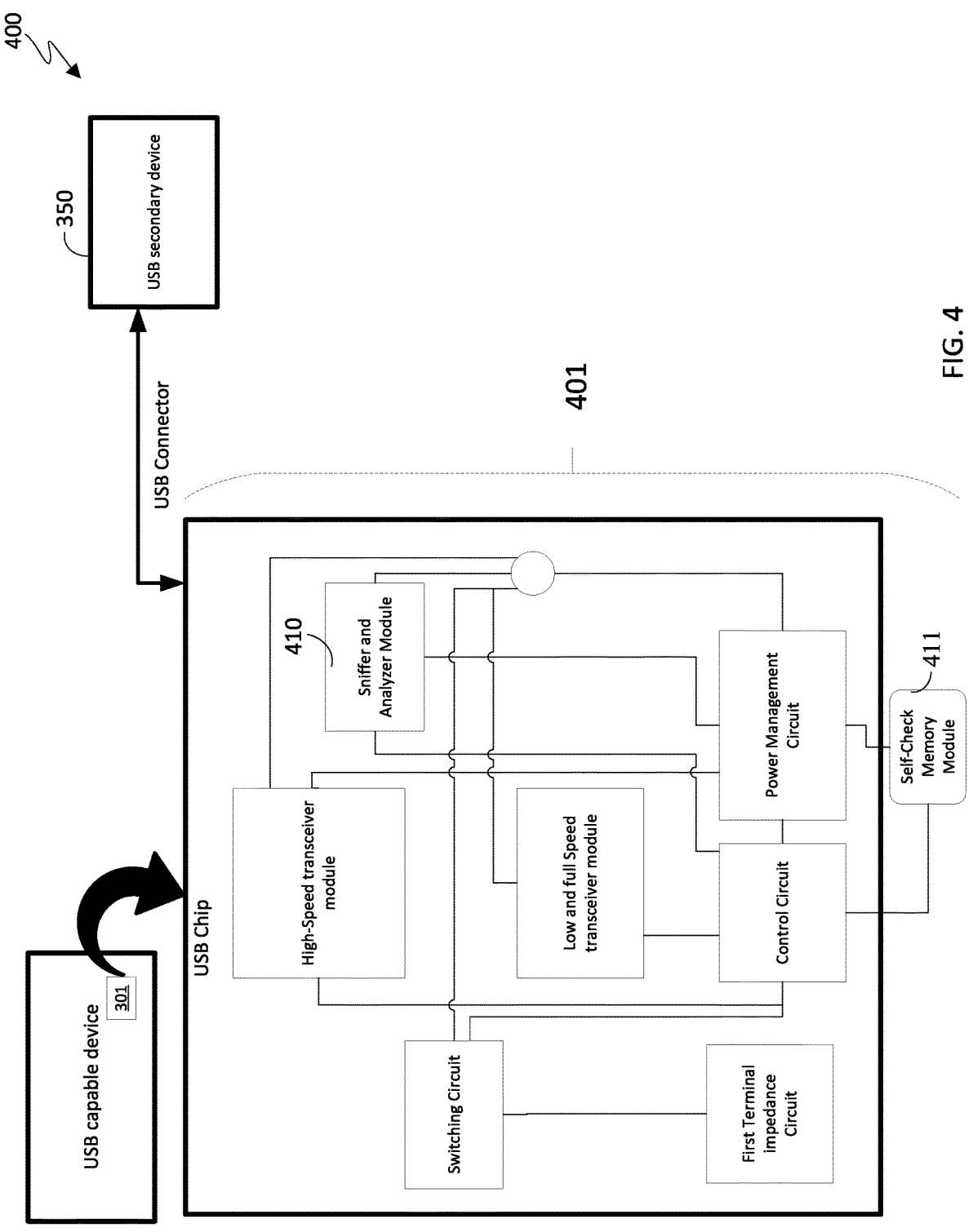
FIG. 4 is diagram illustrating modifications of new features to USB chip of FIG. 3, designated as 400, in accordance with an embodiment of the present invention.

FIG. 4 is diagram illustrating modifications of new features to USB chip of FIG. 3, designated as 400. As previously described by USB chip 301 of FIG. 3, current embodiment of the present invention modifies existing USB chip 301 with a few additional modules, such as sniffer and analyzer module 410, connector junction 430 and self-check memory module 411. For example, USB chip 401 is an upgraded version of USB chip 301 (from FIG. 3). Similarly, sniffer and analyzer module 410 is a replacement to detection circuit 310 and connector junction 430 is a replacement to connector junction 330 (from FIG. 3).

Sniffer and analyzer module 410 enhances existing detection circuit 310 (prior art from FIG. 3) by analyzing data stream for malicious data.

Self-check memory module 411 is an optional module that allows USB chip 401 to commit a check and confirmation of functionality of the entire USB chip.

In certain modes (e.g., one-way mode, secure mode, etc.), the modified USB chip (i.e., 401) of FIG. 4 allows for certain functionality. For example, in a one-way mode (and post handshake), the embodiment can detect a wrong way communication and can (through second switching circuit, not shown) disconnect the data pins. In another example, for a secure mode, 410 can detect malicious data streams and open up the data connection switch to prevent further transfer. Some of the modes will be described with respect to FIG. 5.

Figure 5:
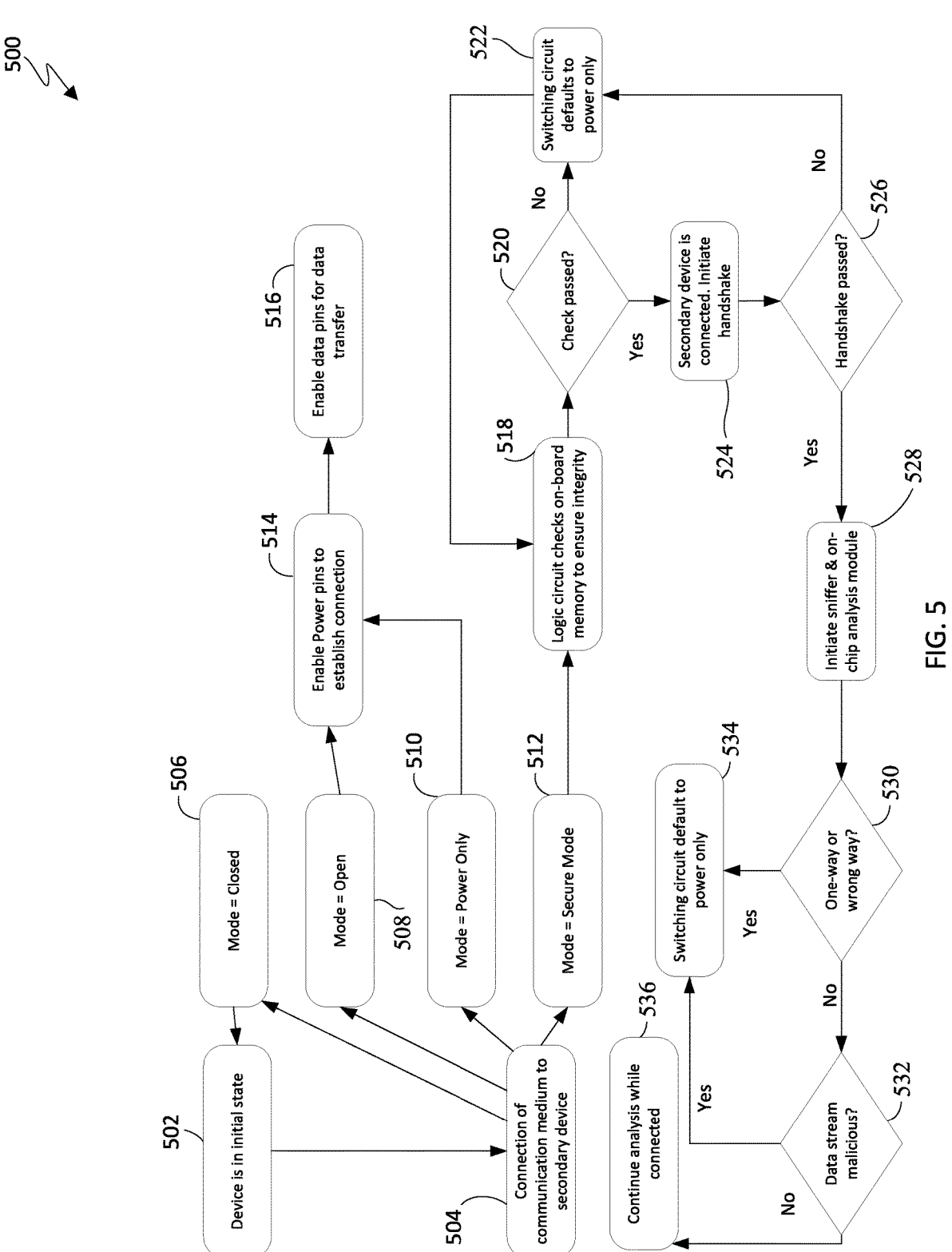
FIG. 5 is a high-level flowchart illustrating the operation of chiplet of FIGS. 2A-2B and similarly operation of modified USB chip of FIG. 4, designated as 500, in accordance with another embodiment of the present invention.

FIG. 5 is a high-level flowchart illustrating the operation of chiplet of FIGS. 2A-2B and similarly to an operation of modified USB chip 401 of FIG. 4, designated as 500, in accordance with another embodiment of the present invention.

Block 502 denotes the initial status (which mode) of the chiplet. There are at least the following modes, i) closed, ii) open, iii) power only and iv) secure mode. It is noted that mode may be established physically on the device with a mechanical switch or electronically by a user and dictated by the initial connection to the user's device (i.e., secondary device). Typically, the initial mode is closed. Closed mode means that all pins of the USB port are disconnected or not allowed any data/power to pass through. Open mode means that all pins of the USB port are connected or allows further data/power to pass through. Power only mode means that only power (i.e. charging) is allowed (i.e., power pins are connected). Secure mode means that all pins are connected and continuously monitored by the chiplet for malicious data and can automatically disconnect either data and/or power pins based on the severity and type of detected malicious data.

Block 504 denotes the communication between primary device to the connected secondary device.

Block 506, block 508, block 510 and block 512 denotes the four available modes (see block 502 for description).

Block 514 and block 516 denotes the instructions (to switching circuit 210 or internal switching circuit of USB chip) to connect power and data pins, respectively.

Block 518 through block 534 denotes how the secure mode operates. Block 518 denotes the circuit (USB chip) check onboard memory to ensure integrity. It is noted that the optional self-check memory module 411 may be utilized for ease of use.

Block 520 denotes a decision block on whether the memory check was successful (passed or failed). If the memory check passed, then there is a handshake sequence with the secondary device (denoted by block 524). Otherwise, if the memory check failed then chiplet (through switching circuits) would change the mode to "power only" mode (block 522).

Block 526 denotes a decision block on whether the handshake between primary and second device was successful. If the handshake was successful, then the process would initiate sniffer and on-chip analysis module to activate (block 528). However, if the handshake was not successful, then the process would select the power only mode (block 522).

Block 530 denotes a decision block on whether there is data communication and which direction is the data flow (e.g., from the primary device to the secondary device or from the secondary device to the primary device or bi-directionally). If it's determined that the data flow should be in a certain direction (i.e., no data should flow from primary device to secondary device since the user is trying to charge his mobile phone) then a warning would be detected. Thus, if the data transfer direction is suspicious (or wrong direction that the user did not intend or not in safe manner as determined by AI module 224) then the power only mode is selected. However, if the data direction is "correct" then another decision block (block 532) must be determined.

Block 532 is a decision block to determine whether the content of the data stream is "malicious." If the embodiment of the present invention has determined that the data stream is malicious then it will select to "power only" mode. Otherwise, it will keep monitoring the data (block 536) stream while the cable is plugged between primary and secondary device.

Alternative Embodiments

The following clauses may be used to illustrate other embodiments:

1. Data connection system with dual connection that has an integrated microcontroller to assess the data flow through the connection and on-system memory.
2. Two hardware independent claims (data transfer medium)
3. USB cable with microcontroller that simply connects/disconnects certain connects (electronic connection/disconnection of pins set by user)
4. USB cable with microcontroller and on board memory that can assess data
5. Detect and enact on wrong-way communication through cable.
6. Important to possibly expand to a USB drive where you want data to only be written to the drive.
7. Disallows writing to a PC that is secured.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Finally, the proposed concept may be summarized in a nutshell in the following clauses:

1. A digital communications system comprising:
   A USB cable comprising two or more USB connection ends.
   In one embodiment, a manual switch that can deactivate certain USB pins.
   In one embodiment, a microcontroller is installed between the connection pins and the wire.
   The microcontroller can connect/disconnect pins mechanically/electronically.
   In one embodiment, the microcontroller is a chiplet with cache memory.
   The cache memory can be used to analyze data signal and enact actuation automatically on the USB pins.
2. A digital communications system comprising:
   A USB drive with one connection end.
   A microcontroller that can connect/disconnect pins mechanically/electronically.
   A cache non-volatile memory (NVM) that is encoded.
   In one embodiment, the connection of the USB drive to a computing system utilizes the encoded NVM as a key to enable communication to the computing system.
3. A data communication device containing a chip.
   The chip of claim 1 contains one or more of a logic circuit, processor, transceiver circuits, power management circuit, switching circuit for data and power connections, and impedance circuits, and external connections.
   The chip of claim 1 that comprises a data stream analysis module.
   The data stream analysis module of the $2^{nd}$ sub-claim may enact the logic circuit to open the control switches.

The chip of claim 1 that comprises an on-chip memory that during initialization of the logic circuit and processor commits a check and confirmation of functionality.
   The logic circuit of sub-claim 1 may be switched into one of several modes to enable or disable external connections.

What is claimed is:

1. A system for managing digital communication between a primary device and a secondary device, the system comprising:
   a USB (Universal Serial Bus) cable comprising a wire and a connection end with one or more pins;
   a plurality of USB chips disposed on the primary and secondary device, respectively, wherein the plurality of USB chips comprises of circuitry that manages power and data communication of the USB cable;
   a manual switch communicatively coupled to the pins in the connection end, wherein the manual switch activates and deactivates the one or more pins in the connection end based on a position of the manual switch; and
   a microcontroller disposed between the wire and the connection end, wherein the microcontroller instructs a switching circuit to activate and deactivate the one or more pins in the connection end based on analyzing data transmitted through the USB cable, wherein the microcontroller comprises a cache NVM (non-volatile memory), wherein the cache NVM is encoded with an algorithm, wherein the algorithm is configured to cause the microcontroller to instruct the switching circuit to activate and deactivate the one or more pins in the connection end based on analyzing data transmitted through the USB cable.

2. The system of claim 1, further comprising:
   a switching circuit disposed between the wire and the connection end.

3. The system of claim 1,
   wherein the algorithm comprises the steps of:
   determining an initial device mode;
   selecting a subsequent mode for the device;
   if the subsequent mode is open then activating all power pins and data pins of the one or more pins;
   if the subsequent mode is closed then deactivating all power pins and data pins of the one or more pins;
   if the subsequent mode is power-only then activating all the power pins of the one or more pins;
   if the subsequent mode is secure then checking on-board memory associated with the microcontroller and initiating handshake;
   in response to a failure with checking on-board memory then selecting power- only mode for the device;
   in response to a failure with handshaking then selecting power-only mode for the device;
   in response to a success with checking on-board memory and handshake then initializing sniffer and on-chip analysis module, wherein the sniffer and on-chip analysis is checking for directional communication;
   determining that the directional communication is not correct or there are malicious data then selecting power-only mode for the device; and
   continuously analyzing the data from the USB cable.

4. The system of claim 1, wherein the switching circuit is capable of electromechanically activating and deactivating the one or more pins of the wire.

5. The system of claim 1, wherein the microcontroller further comprises an AI (artificial intelligence) module configured to continuously learn and predict future malicious data threats.

6. The system of claim 1, wherein the circuitry of the plurality of USB chip further comprises self-check memory module and sniffer and analyzer module, wherein the sniffer and analyzer module are capable of analyzing data stream from the USB cable in real time.

7. The system of claim 6, wherein the self-check memory module is capable of checking and confirmation of functionality of the circuitry of the plurality of USB chips.

8. A system for managing digital communication between primary devices and a secondary device, the system comprising:

the primary devices are one or more hard drives;

one or more cabling between the one or more hard drives to a secondary device, wherein the one or more cabling comprises one or more wires and a connection end with one or more pins;

a manual switch communicatively coupled to the pins in the connection end, wherein the manual switch activates and deactivates the one or more pins in the connection end based on a position of the manual switch;

a microcontroller comprising a cache NVM (non-volatile memory), wherein the cache NVM is encoded with an algorithm; and the microcontroller is disposed between the one or more cabling, wherein the algorithm is configured to cause the microcontroller to electromechanically activate and deactivate respective pins in the connection end of the one or more cabling based on analyzing data transmitted through the one or more cabling.

9. The system of claim 8, further comprising:

the one or more cabling is a USB (universal serial bus) cable;

a plurality of USB chips disposed on the primary and secondary device, respectively, wherein the plurality of USB chips comprises of circuitry that manages power and data communication of the USB cable;

a switching circuit disposed between the one or more cabling and the connection end; and a microcontroller disposed between the one or more cabling and the connection end, wherein the microcontroller instructs the switching circuit to activate and deactivate the one or more pins in the connection end based on analyzing data transmitted through the one or more cabling.

10. The system of claim 9, the algorithm comprises the steps of:

determining an initial device mode;

selecting a subsequent mode for the microcontroller;

if the subsequent mode is open then activating all power pins and data pins of the one or more pins;

if the subsequent mode is closed then deactivating all power pins and data pins of the one or more pins;

if the subsequent mode is power-only then activating all the power pins of the one or more pins;

if the subsequent mode is data-only then activating all the data pins of the one or more pins;

if the subsequent mode is secure then checking on-board memory and initiating handshake;

in response to a failure with checking on-board memory then selecting power- only mode for the device;

in response to a failure with handshaking then selecting power-only mode for the device;

in response to a success with checking on-board memory and handshake then initializing sniffer and on-chip analysis module, wherein the sniffer and on-chip analysis is checking for directional communication;

determining that the directional communication is not correct or there are malicious data then selecting power-only mode for the device; and continuously analyzing the data from the one or more cabling.

11. The system of claim 9, wherein the switching circuit is capable of electromechanically activating and deactivating the one or more pins of the wire.

12. The system of claim 8, wherein the microcontroller further comprises an AI (artificial intelligence) module configured to continuously learn and predict future malicious data threats.

13. The system of claim 9, wherein the circuitry of the plurality of USB chips further comprises self-check memory module and sniffer and analyzer module, wherein the sniffer and analyzer module are capable of analyzing data stream from the USB cable in real time.

14. The system of claim 13, wherein the self-check memory module is capable of checking and confirmation of functionality of the circuitry of the plurality of USB chips.

15. A method for managing digital communication between a primary device and a secondary device wherein the digital communication traverses one or more cabling, the method comprising:

the one or more cabling comprising a wire and a connection end with one or more pins;

a switching circuit disposed between the wire and the connection end; and a microcontroller comprising a cache NVM (non-volatile memory), wherein the cache NVM is encoded with an algorithm and the algorithm comprises the steps of:

determining an initial device mode of the secondary device;

selecting a subsequent mode for the secondary device;

continuously analyzing data from the one or more cabling;

if the subsequent mode is open then activating all power pins and data pins of the one or more pins;

if the subsequent mode is closed then deactivating all power pins and data pins of the one or more pins;

if the subsequent mode is power-only then activating all the power pins of the one or more pins;

if the subsequent mode is secure then checking on-board memory associated with the microcontroller and initiating handshake;

in response to a failure with checking on-board memory then selecting power-only mode for the device;

in response to a failure with handshaking then selecting power-only mode for the device;

in response to a success with checking on-board memory and handshake then initializing sniffer and on-chip analysis module, wherein the sniffer and on-chip analysis is checking for directional communication; and determining that the directional communication is not correct or there are malicious data then selecting power-only mode for the device.

16. The method of claim 15, wherein the microcontroller further comprises an AI (artificial intelligence) module configured to continuously learn and predict future malicious data threats.

17. The method of claim 15, wherein the one or more cabling is a USB cable.

18. The method of claim 15, wherein the primary device or the secondary device contains USB chips, and the USB chip further comprises self-check memory module and sniffer and analyzer module, wherein the sniffer and analyzer module is capable of analyzing data stream from a USB cable in real time.

19. The method of claim 15, wherein the switching circuit is capable of electromechanically activating and deactivating the one or more pins of the wire.

* * * * *